United States Patent
Loke (10) Patent No.: US 10,015,364 B2
(45) Date of Patent: Jul. 3, 2018

(54) SYSTEM AND METHOD FOR PREVIEWING DIGITAL CONTENT

(71) Applicant: Pictureworks Pte Ltd, Singapore (SG)

(72) Inventor: Jong Her Loke, Selangor (MY)

(73) Assignee: Pictureworks Pte Ltd, Singapore (SG)

( * ) Notice: Subject to any disclaimer, the term of this patent is extended or adjusted under 35 U.S.C. 154(b) by 275 days.

(21) Appl. No.: 14/823,091

(22) Filed: Aug. 11, 2015

(65) Prior Publication Data

US 2016/0335746 A1 Nov. 17, 2016

Related U.S. Application Data (60) Provisional application No. 62/159,397, filed on May 11, 2015.

(51) Int. Cl.
| | |
|---|---|
| *G06F 3/00* | (2006.01) |
| *H04N 1/44* | (2006.01) |
| *G06F 3/0488* | (2013.01) |
| *G06F 3/0484* | (2013.01) |
| *H04N 1/00* | (2006.01) |
| *G06F 3/01* | (2006.01) |

(52) U.S. Cl.
CPC ......... *H04N 1/4493* (2013.01); *G06F 3/0488* (2013.01); *G06F 3/04845* (2013.01); *H04N 1/00164* (2013.01)

(58) Field of Classification Search
CPC . G06F 3/04845; G06F 3/0488; H04N 1/4493; H04N 1/00164
See application file for complete search history.

(56) References Cited

U.S. PATENT DOCUMENTS

| | | | |
|---|---|---|---|
| 9,061,589 B2 * | 6/2015 | Bogenberger | B60K 35/00 |
| 2014/0078172 A1 * | 3/2014 | Systrom | G06T 5/002 |
| | | | 345/629 |
| 2015/0020210 A1 * | 1/2015 | Brown | G06F 21/84 |
| | | | 726/27 |
| 2015/0113661 A1 * | 4/2015 | Mishra | G06F 21/6245 |
| | | | 726/26 |
| 2015/0154414 A1 * | 6/2015 | Pike | G06F 21/36 |
| | | | 726/30 |

* cited by examiner

*Primary Examiner* — Nicholas Augustine
(74) *Attorney, Agent, or Firm* — Lombard & Geliebter LLP; Antonio Papageorgiou, Esq.

(57) ABSTRACT

A system for previewing protected media comprising a touchscreen display, a processor, and a memory having executable instructions stored thereon that when executed by the processor cause the processor to receive an original image from a server over a network, generate a blurred copy of the original image, overlay the blurred image over the original image, detect user interaction on the touchscreen display, determine location of the user interaction, and apply a mask on a section of the blurred copy of the original image corresponding to the determined location of the user interaction.

13 Claims, 5 Drawing Sheets

SYSTEM AND METHOD FOR PREVIEWING DIGITAL CONTENT

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

The invention described herein generally relates to image previewing techniques, and in particular, previewing of digital media that is obscured to prevent piracy.

Description of the Related Art

As consumers are more savvy in digital technologies, imaging businesses covering numerous industries ranging from theme parks, attractions, special events to stock photo imaging libraries have changed from selling hard copy prints and media to that of digital soft copies (image files, videos, etc.) that are delivered online via special codes or login access. It is common to provide a preview of the digital media to a potential customer in order for the customer to make a purchase decision. Customers would typically want to preview these digital media for good reasons, such as, to see if their eyes are closed, or to see if their babies are looking at the cameras, or simply to ensure that the picture has a good focus, etc. Consumers may preview the digital media at counters, over mobile or online via computers and all other similar devices now available or to be introduced. However, when digital media is previewed on potential customers own devices, like PC or smart phones, they can be easily captured without the copyright owner's consent.

In order to prevent such abuse, copyright owners may allow potential customers to preview the digital media in smaller thumbnail or watermarked images. The usage of watermarks or smaller thumbnail images neither provide the best experience for consumers nor can it effectively prevent them from having previews taken for use. There is a challenge in picking the right size of thumbnail that allow customers to see the details clearly yet not enough to be captured for unauthorized use. Watermarks can either obscure important parts of the photo or be easily cropped out. Current methods and techniques are inadequate in preventing consumers from stealing the digital media during the preview (before consumers decide to buy them). There is thus a need to prevent unauthorized usage of digital media while offering a preview of the digital media that is useful in the role of the customer's purchasing decision of the digital media.

SUMMARY OF THE INVENTION

The present invention provides a method and system for previewing protected media. According to one embodiment, the system comprises a touchscreen display, a processor, and a memory having executable instructions stored thereon that when executed by the processor cause the processor to receive an original image from a server over a network, generate a blurred copy of the original image, overlay the blurred image over the original image, detect user interaction on the touchscreen display, determine location of the user interaction, and apply a mask on a section of the blurred copy of the original image corresponding to the determined location of the user interaction.

The processor may be configured to generate the blurred copy of the image by duplicating the original image and applying a blur effect on the duplicated image. The applied mask is operable to reveal the section of the blurred copy of the original image. In at least one embodiment, the applied mask includes a window of a predetermined size and shape at the section of the blurred copy of the original image. The processor may be further configured to determine additional user interaction on the touchscreen, and apply additional masks on sections of the blurred copy of the original image corresponding to the determined additional user interaction. The processor may also be further configured to determine absence of user interaction, and remove the mask applied on the section of the blurred copy of the original image.

According to another embodiment, the system comprises a touchscreen display, a processor, and a memory having executable instructions stored thereon that when executed by the processor cause the processor to receive an original image from a server over a network, generate a blurred copy of the original image, presenting the blurred copy of the original image, detect a first user interaction on the touchscreen display, determine location of the first user interaction, extract a first section of the original image corresponding to the determined location of the first user interaction, and present the extracted first section of the original image by pasting the extracted first section on the presented blurred copy of the original image.

The processor may be configured to generate the blurred copy of the image by duplicating the original image and applying a blur effect on the duplicated image. In one embodiment, the extracted first section includes a predetermined size and shape surrounding the location of the first user interaction. The processor may be further configured to detect a second user interaction on the touchscreen, remove the extracted first section of the original image from the presentation of the blurred copy of the original image, determine location of the second user interaction, extract a second section of the original image corresponding to the determined location of the second user interaction, and present the extracted second section of the original image by pasting the extracted second section on the presented blurred copy of the original image.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

Systems and methods are described herein that allow consumers to preview unpaid digital media while preventing them from copying or stealing the digital media. The unpaid digital media may be from across a variety of businesses and industries such as theme parks, attractions, special events, and stock photo libraries in the widest context.

Figure 1:
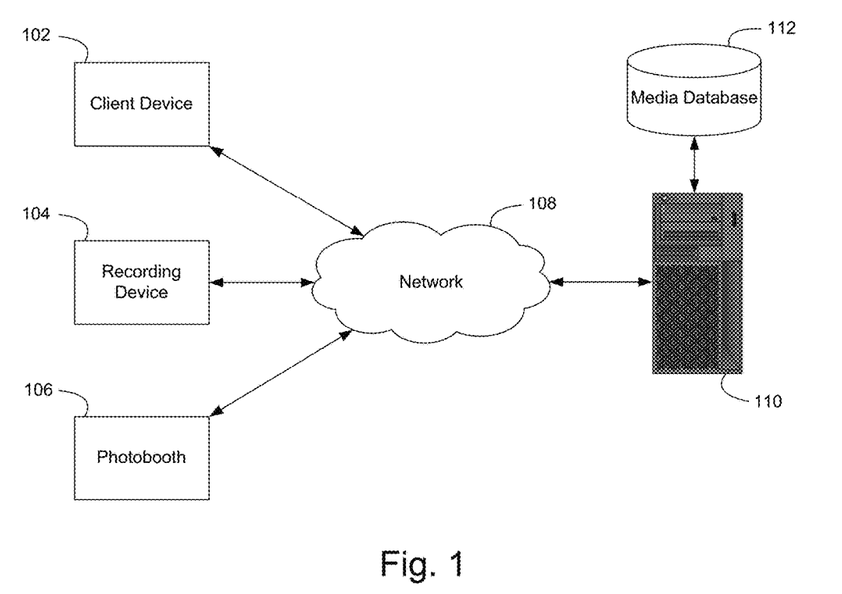
FIG. 1 illustrates a computing system according to an embodiment of the present invention.

FIG. 1 presents a computing system according to an embodiment of the present invention. When visiting a theme park, such as Disney and Universal, for example, guests may be provided with a ticket, card, badge, tag, or similar device that can be linked to or associated to specific photos, videos, or other media that may be recorded or taken by theme park photographers, recording devices, photo booths, or by guest client devices (e.g., using a software application provided by the theme park) as souvenirs that can later be retrieved and purchased. In another embodiment, a park ticket may include a barcode or identifier that may be associated with recorded media of the ticket holder. Client device 102, recording device 104, and photobooth 106 are exemplary devices that may be used to capture media of guests. The media may be recorded on the devices and transmitted to servers 110 via network 108. Servers 110 may store the media in media database 112 where guests may subsequently retrieve or download media corresponding to their ticket, card, badge, tag, identifier, etc.

Network 108 may be any suitable type of network allowing transport of data communications across thereof. The network 108 may couple devices so that communications may be exchanged, such as between servers and client devices or other types of devices, including between wireless devices coupled via a wireless network, for example. A network may also include mass storage, such as network attached storage (NAS), a storage area network (SAN), cloud computing and storage, or other forms of computer or machine readable media, for example. In one embodiment, the network may be the Internet, following known Internet protocols for data communication, or any other communication network, e.g., any local area network (LAN) or wide area network (WAN) connection, cellular network, wire-line type connections, wireless type connections, or any combination thereof. Communications and content stored and/or transmitted to and from client devices may be encrypted using, for example, the Advanced Encryption Standard (AES) with a 256-bit key size, or any other encryption standard known in the art.

The theme park may provide for capturing a guest's experience story at the theme park to re-create the guest's experience in a storybook of digital media recordings. Software application may be provided by the theme park and downloaded (e.g., via a website or from servers 110) by guests onto their client devices 102. The software application may provide a virtual map usable to create an outline for a virtual storybook of the guest's experience at the park. Guests can change or modify the virtual storybook outline or choose from several templates. The virtual map includes locations of places, landmarks, and where guests can record digital media of themselves within the park using theme park devices or photographers (e.g., recording device 104 and photobooth 106). The software application may also include media recording features to allow for recording of digital media by guests using their client devices 102. For example, every time the guest takes a photo with the application on his or her client device, the photos may be added to his or her virtual story book. Imagery of certain themes e.g., of the park or corresponding to a particular section of theme park, may also be added to recorded digital media using the downloaded software application. Templates may be provided by the software application that fixes on location, timing, image, etc. as part of the process for rides and events in the park.

Recorded digital media may be transmitted and stored on servers 110 and media database 112 for purchase by the guests. Servers, as described herein, may vary widely in configuration or capabilities but are comprised of at least a special-purpose digital computing device including at least one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like. The servers are operative to receive requests from client devices and process the requests to generate responses to the client devices across a network. The requests may include requests to preview the digital media, requests for purchase of digital media and/or merchandise associated with the digital media, and request to download, unlock, authenticate or otherwise authorize access to purchased digital media. The network may be any suitable type of network allowing transport of data communications across thereof.

The guests are able to preview the recorded digital media after recording and before purchase. According to embodiments of the present invention, requiring performance of certain user interactions may be used to protect digital media from unauthorized/unpaid obtainment when previewed on devices such as smart phones and computers (preview devices). Digital media may be downloaded for preview on a device but shown in a blurred preview format or initially displayed as blurred renderings of the original digital media content. Blurring and blurred formatting, as used herein, is generally intended to include a distorting manipulation or function applied to and used to protect digital media such as images, audio signals, and video signals. However, it may also be applied to other types of data, including documents (e.g., through line, word or character shifting), software, multi-dimensional graphics models, and surface textures of objects. The blurred renderings obscures or distorts the digital media content until a specific user interaction is performed to prevent users from performing a screen capture or other piracy actions.

To render the digital media viewable (e.g., without blurring), the user may be required to use, place or activate a pointer, either a finger touch or mouse cursor, to roam and maintain user interaction of the finger (e.g., placement or press on a touch screen) or pointer (e.g., holding a mouse-click or key press) on the blurred preview digital media. A section (or window of a predetermined size) of the digital media may be displayed in clear or undistorted upon initializing and maintaining a user interaction in the section. For example, the user may place their finger on the touch screen of a phone (e.g., the preview device) for a section of a blurred preview image to become clear and visible. When the pointer is away or removed, either an entirety of the digital media or a cleared section of the digital media may be returned to a blurred preview format. A user interaction such as roaming of blurred digital media prevents stealing or attempting to print screen for use without payment. By requiring the user to perform a specific user interaction with the digital media, a user is prevented from taking a screen shot or performing another function on the device as a result of the user being preoccupied with maintaining the user interaction.

Size and/or zoom level of the previewed digital media do not need to be restricted and allows users to view details of the digital media more clearly. This increases the user's propensity to buy the digital media because users can preview from low resolution to high resolution digital media, actual size or zoomed in. Users satisfied with the preview may purchase a pass or code to download authenticated (unblurred) versions of the digital media or to unlock and clear the blurred digital media.

Embodiments of the present invention may be implemented using a touch screen on a mobile phone device or on any other client devices that allows for a finger or mouse or any form of pointing instrument used to move across a screen for preview of digital media. Client devices may comprise computing devices (e.g., desktop computers, television set top boxes, terminals, laptops, personal digital assistants (PDA), cell phones, smart phones, tablet computers, e-book readers, smart watches and wearable devices, or any computing device having a central processing unit and memory unit capable of connecting to a network). Additionally, client devices may be either mouse-based or pointer-based devices (e.g., Windows PC, Mac, Chromebook) or touch-based devices (e.g., Smart phones, tablets, any other mobile devices). The term 'pointer' used herein may generally refer to a mouse pointer or cursor if mouse-based devices are used, and finger touch if touch-based devices are used.

A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games. A client device may include or execute a variety of operating systems, including a personal computer operating system, such as a Windows, Mac OS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples.

Figure 2:
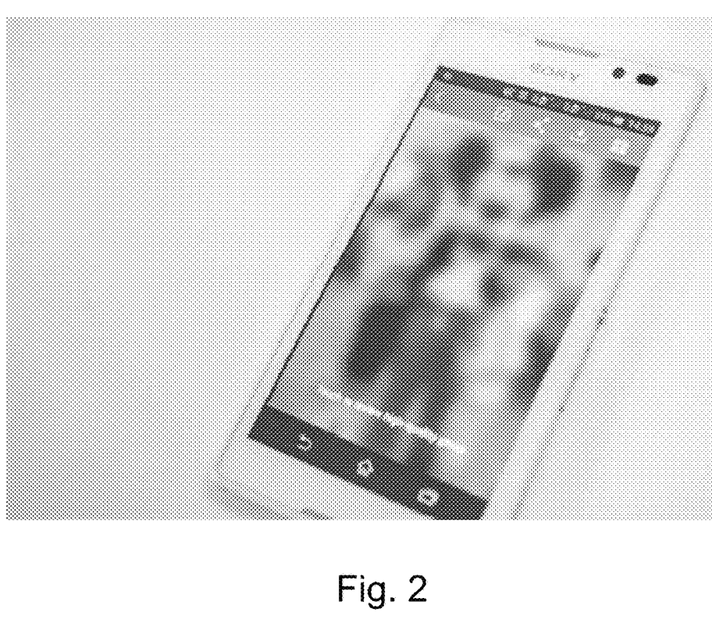
FIG. 2 illustrates a computing device according to an embodiment of the present invention.

FIG. 2 presents a preview image shown on a client device as a blur image.

Figure 3:
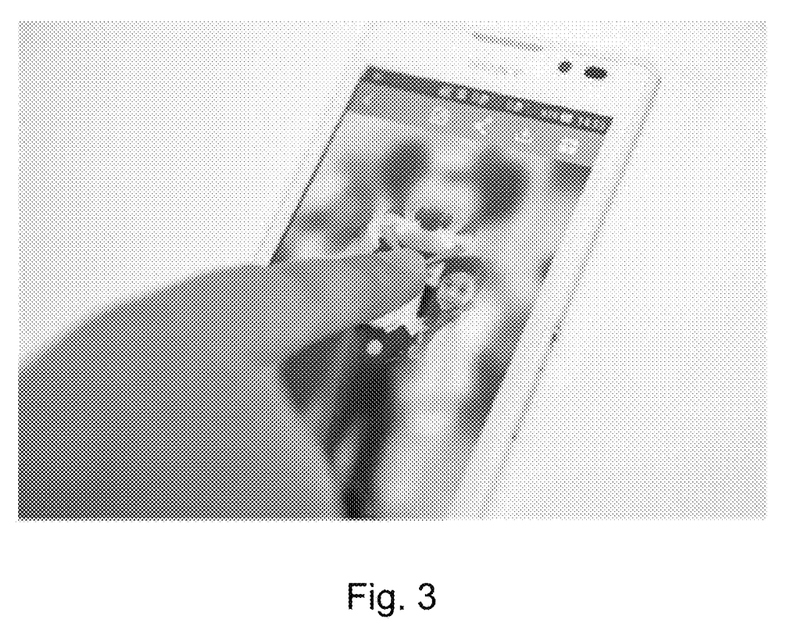
FIG. 3 illustrates another computing device according to an embodiment of the present invention.

FIG. 3 presents upon touching on the client device, the surrounding areas of the touch point will gradually become clear. While a user moves their fingers across the screen, the clear effect follows the immediate areas surrounding of the touch point while the remaining part of the picture remains blurred. According to the illustrated embodiment, users may be allowed to select an area on a preview image that they would like to preview and yet not be able to preview the full image at one instance. This mechanism is operable to prevent users from performing a screen capture.

Figure 4:
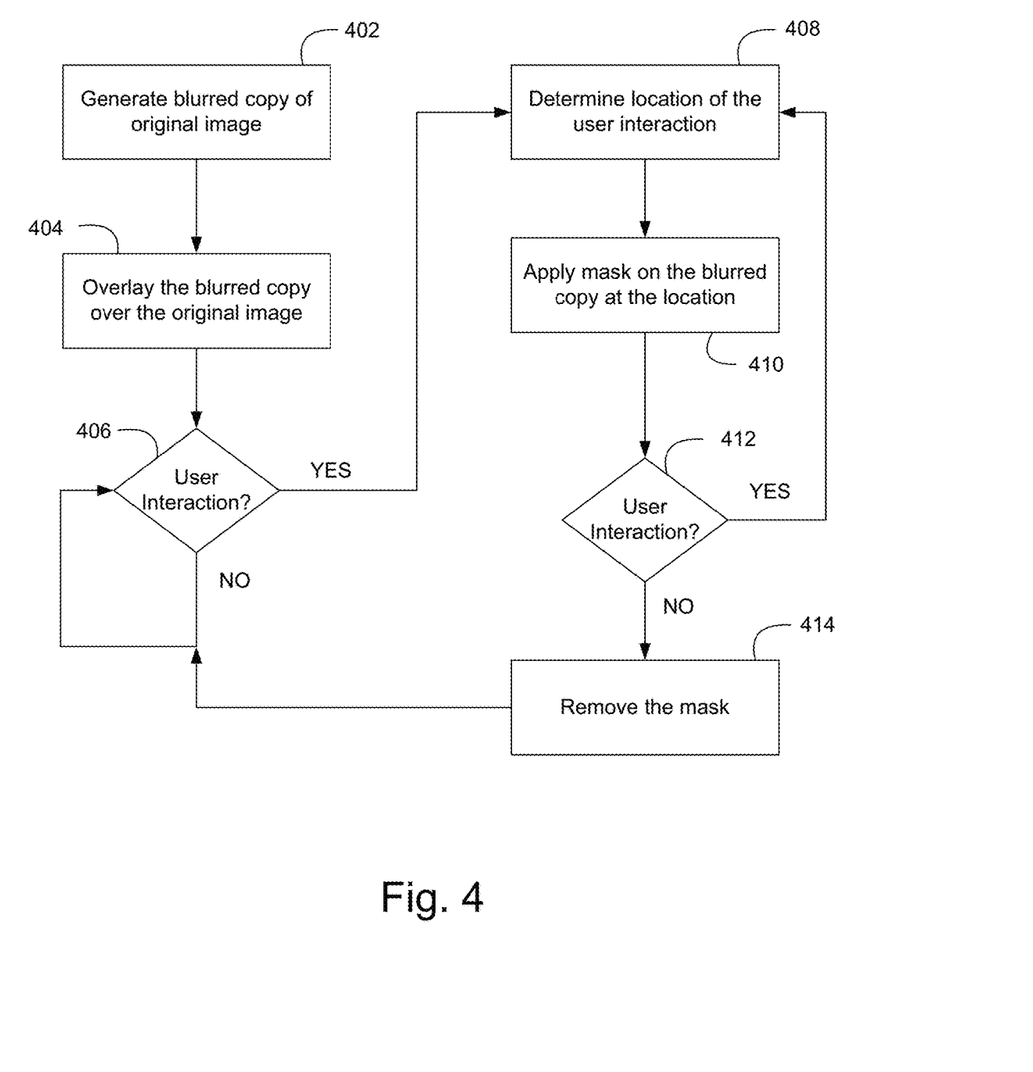
FIG. 4 illustrates a flowchart of a method for previewing digital media according to an embodiment of the present invention.

FIG. 4 presents a flowchart of a method for previewing digital media according to an embodiment of the present invention. A blurred copy of an original image is generated, step 402. The original image may be a photograph, frame of video, text, etc., received from a server for preview on a preview or client device. Generating a blurred copy of the original image includes duplicating an original image and applying a blur effect, filter or operation on the duplicated image.

The blurred copy of the original image is overlaid over the original image, step 404. The original image may be placed at the bottom or on a first layer while the blurred copy of the original image is placed on top of the original image or on a second layer exactly on top of the original image. A visualization of the layer of images may be presented or displayed to a user on a client device. The blurred copy of the original image is opaque or non-transparent such that from a user's perspective, the user can only see the blurred copy of the original image. The method waits for user interaction, step 406. The user interaction may be a touch press or mouse-clicked hover on the blurred copy of the original image.

When a user touch or mouse hover is detected on the blurred copy of the original image, location of the user interaction is determined, step 408. A mask is applied on the blurred image at the location, step 410. The mask causes a section of the blurred copy of the original image to be transparent, and hence, the original image on the bottom layer at the section to be revealed. The mask may be a window of a predetermined size and shape surrounding the location of the user interaction.

Further or additional user interaction is determined, step 412. As the user drags his finger, or mouse move, across the blurred copy of the original image, the mask follows the finger touch, or mouse, position and reveals the section of the original image on the bottom layer according to the user interaction location. When user lifts his finger or mouse out (absence of user interaction), the mask is removed from the blurred copy of the original image, step 414, and the user will only see the blurred copy of the original image. The system may either cumulatively reveal sections of the original image on the bottom layer or only reveal sections according to current user interaction location and removing masks of previous user interaction locations.

Figure 5:
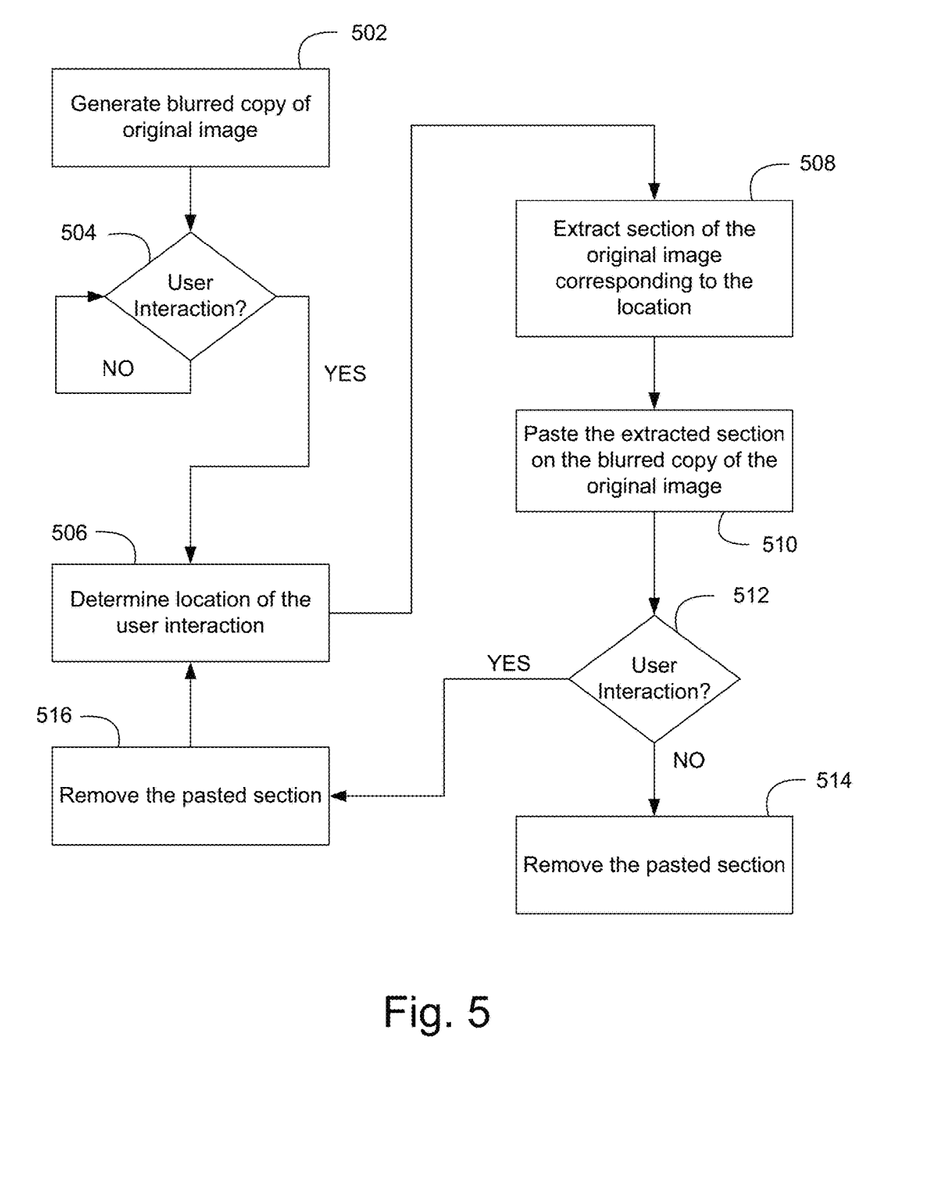
FIG. 5 illustrates a flowchart of a method for previewing digital media according to another embodiment of the present invention.

FIG. 5 presents a flowchart of a method for previewing digital media according to another embodiment of the present invention. A blurred copy of the original image is generated, step 502. Generating the blurred copy of the image includes duplicating an original image and applying a blur effect on the duplicated image. The blurred copy of the original image may be presented or displayed to a user on a client device. A user interaction is monitored, step 504. The client device may waits for the user to touch press or mouse-click hover on the blurred copy of the original image.

A location of the user interaction is determined, step 506. When the user's finger touch, or mouse-click over the blurred copy of the original image, the client device may detect the position of the touch or mouse. A section of the original image corresponding to the location of the user interaction is extracted, step 508. In a next step 510, the extracted section is pasted on the blurred copy of the original image, step 510. The extracted section is pasted onto the blurred image at position of the location of the user interaction (finger touch or mouse pointer) so it appears as the original image is shown at the position of the finger touch or mouse pointer. The extracted section may be of a predetermined size and shape surrounding the location of the user interaction.

Additional user interaction is determined, step 512. When the user drags his or her finger, or moves the mouse pointer across the blurred copy of the original image, the previous pasted section may be removed, step 516 and method proceeds to repeat steps 506 through 510. This will appear as the original image is shown where the finger touches or mouse pointer moved. When the user lifts his or her finger, or mouse out, any pasted section will be removed and leaves the blurred copy of the original image to be shown, step 514.

FIGS. 1 through 5 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A system for previewing protected media, the system comprising:
    a touchscreen display;
    a processor; and
    a memory having executable instructions stored thereon that when executed by the processor cause the processor to:
    receive an original image from a server over a network;
    generate a blurred copy of the original image;
    overlay the blurred image over the original image and display the blurred image on the touchscreen display;
    detect user interaction on the touchscreen display;
    determine a location of the user interaction;
    apply a mask on a section of the blurred copy of the original image corresponding to the determined location of the user interaction;
    determine absence of the user interaction; and
    remove the mask applied on the section of the blurred copy of the original image in response to determining the absence of the user interaction, wherein the mask is applied only while the user interaction is maintained and at other instances only the blurred copy of the original image is displayed during a preview of the protected media.

2. The system of claim 1 wherein the processor is configured to generate the blurred copy of the image by duplicating the original image and applying a blur effect on the duplicated image.

3. The system of claim 1 wherein the applied mask reveals the section of the blurred copy of the original image.

4. The system of claim 1 wherein the applied mask includes a window of a predetermined size and shape at the section of the blurred copy of the original image.

5. The system of claim 1 wherein the processor is further configured to:
 determine additional user interaction on the touchscreen; and
 apply additional masks on sections of the blurred copy of the original image corresponding to the determined additional user interaction.

6. A system for previewing protected media, the system comprising:
 a touchscreen display;
 a processor; and
 a memory having executable instructions stored thereon that when executed by the processor cause the processor to:
  receive an original image from a server over a network;
  generate a blurred copy of the original image;
  presenting the blurred copy of the original image;
  detect a first user interaction on the touchscreen display;
  determine a location of the first user interaction;
  extract a first section of the original image corresponding to the determined location of the first user interaction; and
  present the extracted first section of the original image by pasting the extracted first section on the presented blurred copy of the original image;
  determine absence of the first user interaction; and
  remove the extracted first section from the blurred copy of the original image in response to determining the absence of the first user interaction, wherein the extracted first section is applied only while the first user interaction is maintained and at other instances only the blurred copy of the original image is displayed during a preview of the protected media.

7. The system of claim 6 wherein the processor is configured to generate the blurred copy of the image by duplicating the original image and applying a blur effect on the duplicated image.

8. The system of claim 6 wherein the extracted first section includes a predetermined size and shape surrounding the location of the first user interaction.

9. The system of claim 6 wherein the processor is further configured to:
 detect a second user interaction on the touchscreen;
 remove the extracted first section of the original image from the presentation of the blurred copy of the original image;
 determine location of the second user interaction;
 extract a second section of the original image corresponding to the determined location of the second user interaction; and
 present the extracted second section of the original image by pasting the extracted second section on the presented blurred copy of the original image.

10. A method for previewing protected digital media performed by a device having a touchscreen display, a processor, and a memory, the memory having executable instructions stored thereon that when executed by the processor cause the processor to perform steps comprising:
 receiving an original image from a server over a network;
 generating a blurred copy of the original image;
 displaying the blurred image on the touchscreen display;
 detecting a user interaction on the touchscreen display;
 determining a location of the user interaction on the touch screen display;
 applying a mask on a section of the blurred copy of the original image corresponding to the determined location of the user interaction, the mask removing the blurred image and displaying the original image at the determined location of the user interaction;
 determining an absence of the user interaction; and
 removing the mask applied on the section of the blurred copy of the original image in response to determining the absence of the user interaction, wherein the mask is applied only while the user interaction is maintained and at other instances only the blurred copy of the original image is displayed on the touchscreen during a preview of the protected media.

11. The system of claim 1, wherein the user interaction on the touchscreen display prevents a screen capture from being performed on the system.

12. The system of claim 6, wherein the first user interaction on the touchscreen display prevents a screen capture from being performed on the system.

13. The method of claim 10, wherein the user interaction on the touchscreen display prevents a screen capture from being performed on the system.

* * * * *